United States Patent [19]

Held

[11] Patent Number: 5,490,900
[45] Date of Patent: Feb. 13, 1996

[54] IN-LINE APPLICATIONS OF FACING FOILS TO PARTICLE BOARDS

[76] Inventor: Kurt Held, Alte Strasse 1, 78647 Trossingen, Germany

[21] Appl. No.: 220,118

[22] Filed: Mar. 30, 1994

[30] Foreign Application Priority Data

Apr. 1, 1993 [DE] Germany ............. 43 10 685.4

[51] Int. Cl.⁶ .................. B30B 5/06; B30B 15/34
[52] U.S. Cl. ............ 156/555; 156/583.5; 100/93 RP; 100/154; 425/371
[58] Field of Search ................ 156/555, 583.1, 156/583.5; 100/93 RP, 154; 425/371; 51/306, 308, 309

[56] References Cited

U.S. PATENT DOCUMENTS

| | | | |
|---|---|---|---|
| 4,311,550 | 1/1982 | Kerttula | 156/555 |
| 4,569,155 | 2/1986 | Fischer et al. | 100/160 X |
| 4,599,128 | 7/1986 | Held | 156/583.5 X |
| 4,606,738 | 8/1986 | Hayden | 51/309 X |

*Primary Examiner*—David A. Simmons
*Assistant Examiner*—J. Sells
*Attorney, Agent, or Firm*—Klaus J. Bach

[57] ABSTRACT

A method and apparatus for the continuous application of surface cover foils to the surfaces of particle boards wherein the particle board is surfaced and roughened as it leaves a double band press in which it is manufactured. A grinding and roughening tool includes a carrier studded with grinding crystals which carrier is pressed against the surface of the particle board by pressurized air while it is oscillated in a direction normal to the movement of the particle board. Subsequently, decorative foils taken from rolls are applied to the particle board surfaces and attached thereto under heat and pressure while the particle board with the decorative foils thereon is moved through an isobaric double band press.

10 Claims, 2 Drawing Sheets

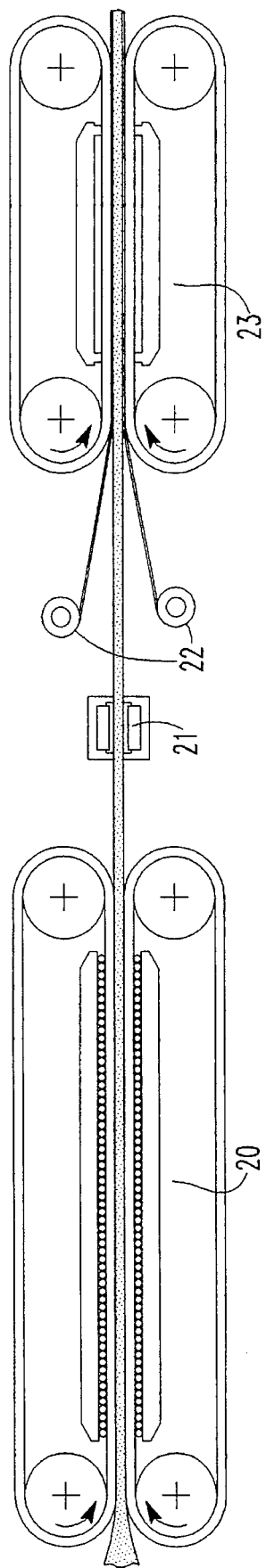

IN-LINE APPLICATIONS OF FACING FOILS TO PARTICLE BOARDS

BACKGROUND OF THE INVENTION

The invention relates to a continuous direct application of decorative foils to particle boards and an apparatus for the preparation of the particle board surfaces therefor.

Since the late seventies particle boards are manufactured by double band presses in a continuous process. This resulted in advantages with regard to quality and efficiency. Similar advances in the processing of particle boards have not been achieved since then.

Before application of the foils the particle board surfaces must be roughened. For the roughening of the particle board surfaces, wide-band grinding machines are still in use. During the manufacture of particle boards in non-continuous multilayer plate presses, a so-called sand layer is formed in which the resin is cured too early and which is therefore brittle. It has to be removed from the particle board before further processing so that a decorative coating can be firmly attached to the surface.

The improved process procedure in double band presses prevents the formation of such sand layers. Instead, a so-called press skin is formed which is a thin surface layer consisting essentially exclusively of resin. This surface is very smooth and is accordingly not a suitable base for cove rings which are cemented thereon or directly applied thereto. It has to be slightly toughened in order to provide for an excellent adhesion base.

Band grinding machines are not capable of simply roughening the press skin. They remove generally several tenths of a millimeter of material if increasingly dull grinding particles are present on the surface. This material then becomes lost as grinding dust and generates problems with regard to work safety and the environment. Since further the grinding equipment has a particular geometrical shape, such shape is transferred to the particle board surface. However the shapes of the press surfaces of a band grinding machine are generally less accurate than those of the double band press so that thickness errors are ground into the particle board surface.

In addition the band grinding machines produce, depending on the arrangement, longitudinal or transverse grooves in the particle board surface which, under disadvantageous circumstances, may show on the surface of the subsequently applied coating layer.

SUMMARY OF THE INVENTION

A method and apparatus for the continuous application of decorative foils to the surfaces of particle boards wherein the particle board is surfaced and toughened as it leaves a double band press in which it is manufactured. A grinding and roughening tool includes a carrier studded with grinding crystals which carrier is press ed against the surface of the particle board by pressurized air while it is oscillated in a direction normal to the movement of the particle board. Subsequently, (decorative) foils taken from rolls are applied to the particle board surfaces and attached thereto under heat and pressure while the particle board with the (decorative) foils thereon is moved through an isobaric double band press.

The apparatus according to the invention solves these problems since the roughening of the press skin is achieved by means of a tool which operates in accordance with the principle of the slide grinding machines as used in metal working: A rocking movement transverse to the advancing direction of the particle board generates a finely structured surface of good adhesion whose intersecting work traces provide for a planar surface.

BRIEF DESCRIPTION OF THE DRAWINGS

FIG. 2 shows schematically a particle board manufacturing procedure according to the invention.

DESCRIPTION OF THE PREFERRED EMBODIMENTS

Figure 1:
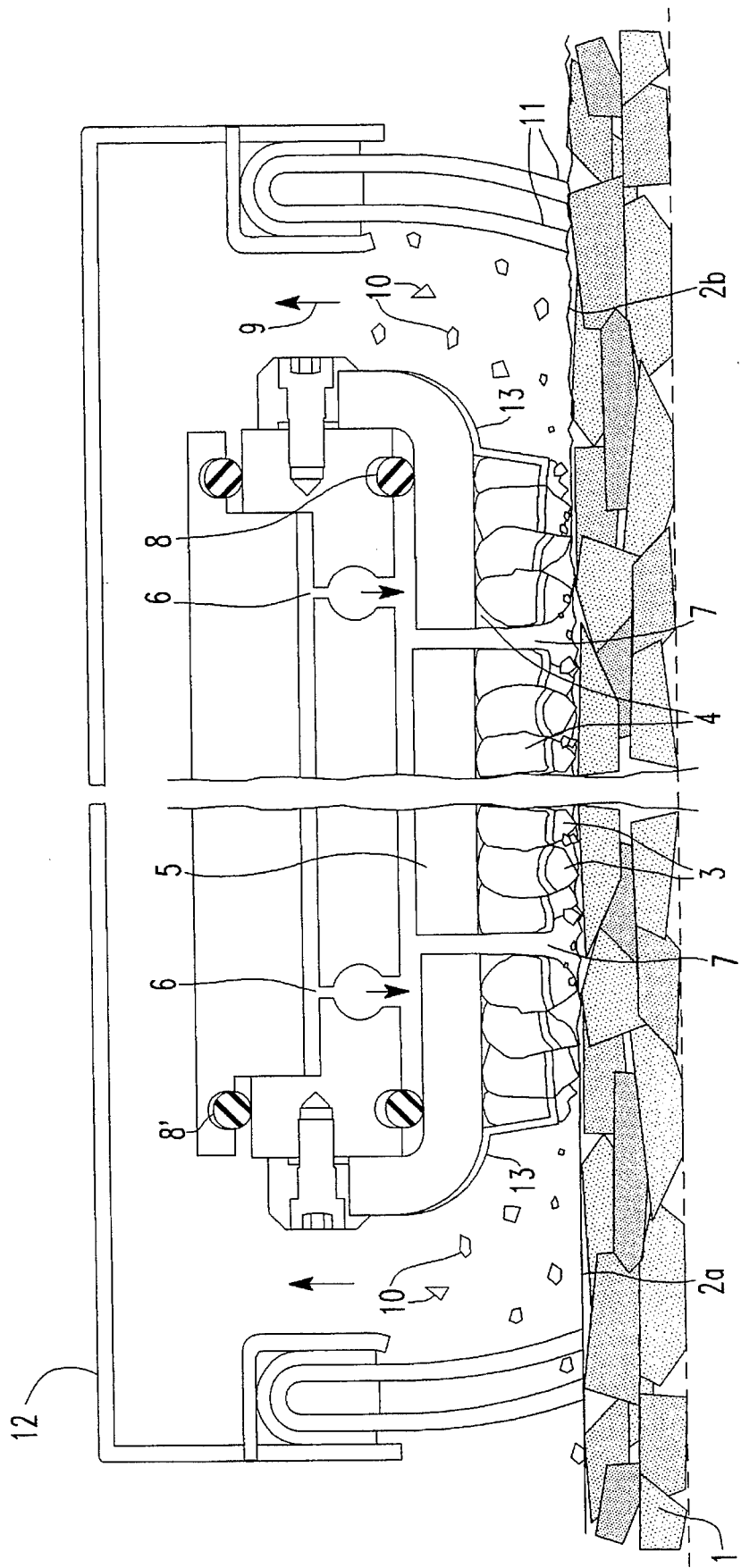
FIG. 1 shows schematically the grinding apparatus according to the invention.

The presentation of FIG. 1 is schematic and not in proper proportions. A press skin 2a disposed on the particle board 1 is roughened by diamond crystals 3 which are attached to a stainless steel carrier 5, by means of galvanically or chemically deposited nickel 4. The carrier 5 is pressed toward the particle board by means of air 6 under pressure with the compressed air being released via passages 7. The compressed air discharged through the passages 7 carries away the grinding dust and dirt particles 10 which are then sucked away from under the hood 12 as indicated by arrow 9. Brushes 11 mounted on the hood 12 so as to be in contact with the particle board surface reinforce the cleaning action of the compressed air by dislodging particles attached to the board surface.

Since the thin carrier 5 is pressed onto the particle board by the pressurized air, it fully adapts to the surface of the particle board. Any protruding particles are engaged and embedded since they are substantially softer than the tool.

Because of the thin coating of the nickel layer and the grinding surface with extremely hard diamond or boron or titanium nitride crystals 13, the hard grinding particles are not broken from the nickel layer during grinding operation.

Preferably the carrier 5 has path areas free of grinding crystals to facilitate removal of grinding dust from the grinding areas. For this purpose the carrier sheet is provided with openings in the center of the areas with grinding crystals for the discharge of pressurized air and the removal of grinding dust.

For in creased life of the grinding carrier sheets, embedment of the crystals is reinforced by a protective layer applied to the carrier sheet over the grinding crystals to prevent dislodging of the crystals. The protective layer may be applied by chemical vapor deposition from a gas phase, by physical vapor deposition from a gas phase or by plasma enhanced chemical vapor deposition.

Adaption of the finishing tool to the shape of the particle board by means of the pressurized air makes it possible to roughen the surface without removing essential amounts of material. As a result only a relatively small amount of grinding dust is generated which can easily be sucked away and which therefore will not become entrapped under the decorative cover foil or paper where it would show through the cover foil or detrimentally affect adhesion thereof to the particle board when finished.

The economical advantage offered by the continuous manufacturing process developed for the particle board was partly lost, so far, since further manufacturing steps occurred in a non-continuous manner. In order to apply surface layers directly to the continuously manufactured particle boards, short cycle presses are utilized which have an operating cycle of 45–90 seconds. The particle boards are first cut to the desired sizes and then stored to mature. The decorative foils, that is, the decorative paper, is normally precut before application.

The decorative foil or paper is accurately cut to fit the particle boards onto which it is then placed. Unrolling of the foil from a roll as it is needed for application to the particle board over the length of a press cycle has not been realized so far because of the fragility of the foils, particularly of the melamine resin decorative foils.

In order to take the foils from rolls when operating with short cycle presses the rolls would have to be accelerated and slowed down with the press cycle since their movement cannot be achieved solely by pulling since the foil material is much too fragile for the forces that would be involved.

The major problem with short cycle presses however resides in the speed of operation which is much slower than that of the double band presses for the manufacture of the particle boards. Double band presses for the manufacture of particle boards operate at a speed of 8–10 m/min which would require short cycle presses with a 60 sec. cycle to have an 8–10 m reaction zone in order to handle all the raw particle boards produced by a double band press.

That means that several short cycle presses would be required for each double band press and in addition a substantial amount of equipment for the preparing of the cover foils and for the transport of all the materials is required. It all adds up to excessive requirements for building space and volume.

The method according to the invention makes it possible to use continuous processes for the manufacture of the particle board and the application of decorative foils thereto up to the cutting of the finished boards.

If, for the application of the foil to the surface of the particle board, another double band press is used, both presses, that is, the double band press for manufacturing the particle board and that for the application of the decorative foil, can be synchronized with one another so that they operate at the same production rate.

FIG. 2 shows schematically such a manufacturing arrangement. The particle boards are manufactured in an isochoric double band press 20. The surface toughening tool 21 described earlier is disposed adjacent the double band press 20 and treats the continuous particle board as it leaves the double band press 20. The decorative foils or papers are taken from a roll support station 22 which may also include automatic means for changing the foil material. They are placed onto the surface or surfaces of the particle board as it enters an isobaric double band press 23 in which the foils or paper sheets are pressed and glued onto the particle board surface in a continuous manner.

Such an arrangement is novel and advantageous: No such arrangement has been in existence since there was no tool capable of preparing the still hot particle boards for the application of decorative surface layers so that a waiting period for the cooling of the particle boards was heretofore necessary. The tool 21 eliminates the requirement for such a waiting period and allows for immediate application of the decorative foil as the particle board comes from the double band press 20.

Also, the wood processing industry generally utilizes isochoric double band presses as they are used also for the manufacture of the particle boards. These presses are designed to provide for a predefined geometric shape of the reaction zone which, for the manufacture of the particle boards, is well within the manufacturing tolerances and therefore presents no problems. However such a given shape is not appropriate for the application of foils since the surface shape of the particle board and that of the isochoric press band surfaces may not coincide so that the pressure applied to the packet of particle board and decorative surface layer is not even. This may provide for strips in which insufficient pressure is applied to provide for reliable attachment of the cover sheet to the particle board.

The use of an isobaric double band press in which the reaction pressure is provided by a pressurized fluid which engages the press band and presses it against the surface of the particle board so that it can adjust to the surface shape of the board provides for even surface pressure and prevents therefore the formation of areas with insufficient attachment of the cover foils.

Since a double band press is operating continuously there are no problems with the handling of the cover foil or paper which is continuously rolled off the rolls. Such handling is known in principle from the manufacture of decorative laminates and therefore does not need any particular explanation.

The combination of the grinding tool according to the invention, a continuous foil unrolling station and an isobar double band press for the application of the foils to the surface of the particle board while moving through the isobar double band press permits the utilization of the economical advantages offered by a continuous manufacturing process from the manufacture of the particle board to the cutting of the final decorative surface coated boards.

What is claimed is:

1. An apparatus for the continuous manufacture of particle boards provided with cover foils, comprising: an isochoric-double band press in which a continuous particle board is manufactured, a grinding station with a grinding crystal carrier sheet arranged adjacent said isochoric double band press and engaging the surface of said particle board as it leaves said isochoric double band press with a rocking motion normal to the movement of the particle board for roughening the surface thereof, a foil unrolling station for placing a foil onto said particle board after it, is roughened in said grinding station and an isobaric double band press disposed adjacent said foil unrolling station and receiving said particle board with said foil placed thereon, said isobaric double band press heating and compressing said particle board for attachment of said foil to the particle board surface during its movement through said isobaric double band press.

2. An apparatus according to claim 1, wherein said grinding crystal carrier sheet which is provided with hard grinding crystals is pressed in engagement with said particle board surface by air pressure means and has path areas free of grinding crystals and air supply openings in the area of the grinding crystals for the discharge of pressurized air for blowing out dust ground from said particle board surfaces.

3. An apparatus for preparing the surface of a particle board for the direct application of a surface cover foil or the removal of a press skin on the surface of the particle board, said apparatus comprising a carrier supported for oscillating movement and provided with hard grinding crystals disposed adjacent the surface of the particle board so as to be movable in a direction normal to the movement of the particle board, and air pressure means for pressing said carrier onto the surface of said particle board for surfacing and toughening the surface of said particle board as it moves past said crystal studded carrier sheet, said carrier having path areas free of grinding crystals for the discharge of grinding dust.

4. An apparatus according to claim 3, wherein said carrier is provided with openings in the center of the areas with grinding crystals to permit the discharge of pressurized air therethrough for blowing out said grinding dust through said path areas.

5. An apparatus according to claim 3, wherein embedment of said grinding crystals is reinforced by a protective layer applied onto said carrier over said grinding crystals to prevent dislodging of the crystals by already dislodged grinding particles.

6. An apparat according to claim 5, wherein said protective layer is provided by chemical vapor deposition from a gas phase.

7. An apparatus according to claim 5, wherein said protective layer is provided by physical vapor deposition from a gas phase.

8. An apparatus according to claim 5, wherein said protective layer is provided by plasma enhanced chemical vapor deposition.

9. An apparatus according to claim 3, wherein a hood is provided and further means are provided for sucking air from said hood for the removal of grinding dust from the area around said tool which is covered by said hood.

10. An apparatus according to claim 3, wherein said hard grinding crystals comprise at least one of the group of diamond crystals, boron nitride crystals and titanium nitride crystals.

* * * * *